D. W. TOWER.
LATCH LOCK.
APPLICATION FILED APR. 21, 1911.
Reissued July 18, 1911.
13,275.
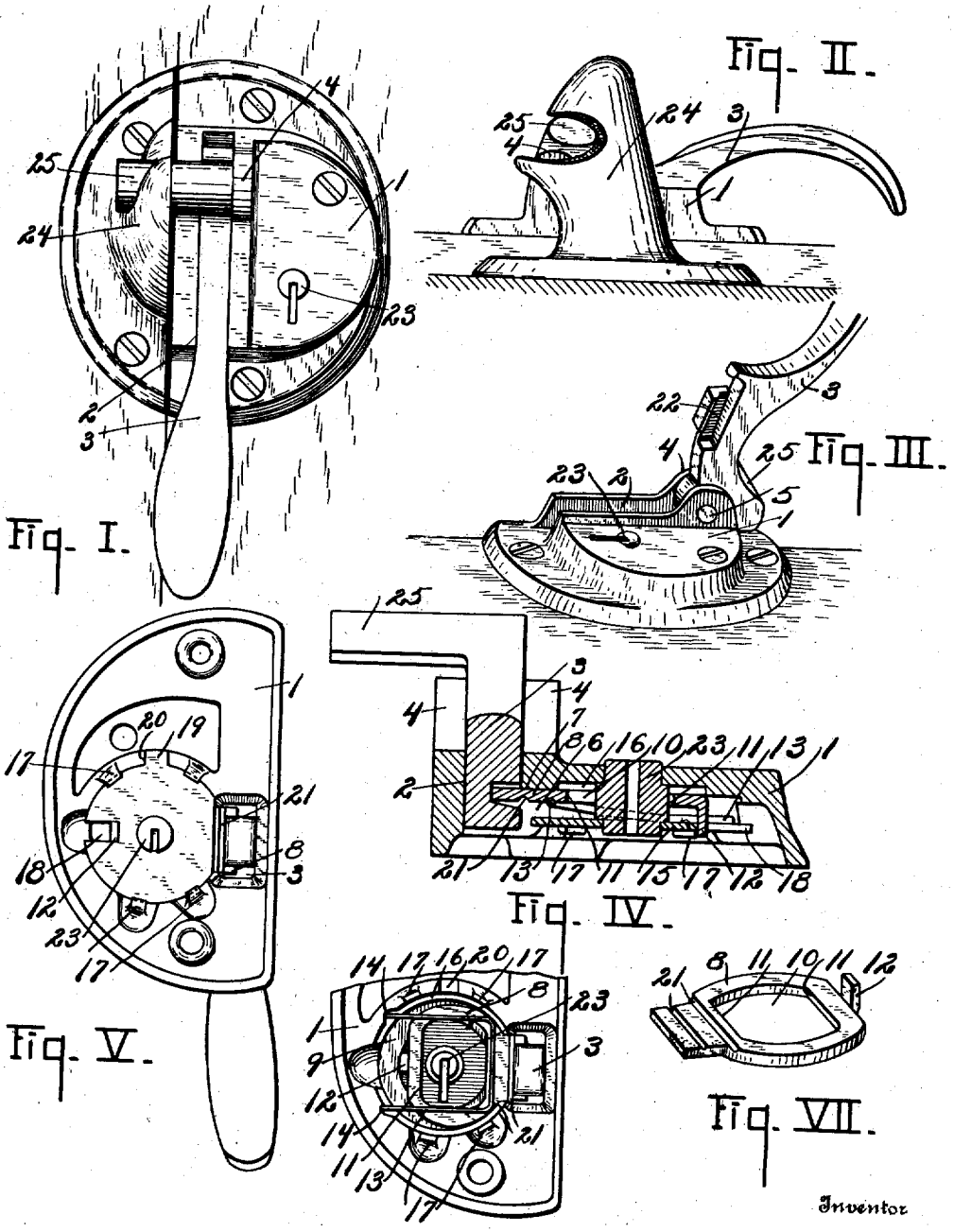
Witnesses
M. O. Woodruff
Margaret Shaler
Inventor
Daniel W. Tower
By Chappell & Earl
Attorneys
COLUMBIA PLANOGRAPH CO., WASHINGTON, D. C.

UNITED STATES PATENT OFFICE.

DANIEL W. TOWER, OF GRAND RAPIDS, MICHIGAN, ASSIGNOR TO GRAND RAPIDS BRASS CO., OF GRAND RAPIDS, MICHIGAN.

LATCH-LOCK.

13,275. Specification of Reissued Letters Patent. Reissued July 18, 1911.

Original No. 987,190, dated March 21, 1911, Serial No. 597,896. Application for reissue filed April 21, 1911. Serial No. 622,583.

*To all whom it may concern:*

Be it known that I, DANIEL W. TOWER, a citizen of the United States, residing at the city of Grand Rapids, county of Kent, and State of Michigan, have invented certain new and useful Improvements in Latch-Locks, of which the following is a specification.

This invention relates to improvements in latch locks.

My improved latch lock is especially designed by me for refrigerator doors, and I have illustrated it herein adapted for such use. My improvements are, however, adapted for and capable of use in various relations.

The main objects of this invention are to provide an improved latch lock which is simple and economical in structure, and, at the same time, effective and one which is not likely to get out of repair.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention, is clearly illustrated in the accompanying drawing, forming a part of this specification, in which:

Figure 1 is a plan view of a structure embodying my improvements. Fig. 2 is a side view thereof looking from the left of Fig. 1. Fig. 3 is a perspective view with the latch open, the keeper not being illustrated. Fig. 4 is an enlarged vertical section taken on a line corresponding to line 4—4 of Fig. 1, the keeper being omitted. Fig. 5 is an inverted view. Fig. 6 is a detail inverted view with the plate 15 removed. Fig. 7 is a perspective view of the bolt 8.

In the drawings, similar reference characters refer to similar parts throughout the several views, and the sectional views are taken looking in the direction of the little arrows at the ends of the section lines.

Referring to the drawing, the casing 1 is provided with a groove-like latch seat 2 adapted to receive the latch 3. This latch is pivoted on the ears 4 to swing down into the seat, the pivot 5 being arranged through the ears and the latch, as shown in the drawings. The casing is also provided with an internal cylindrical bolt chamber 6, which opens at 7 into the latch seat 2.

The bolt 8 is slidably arranged on an annular seat 9 provided therefor in the bolt chamber. The bolt 8 is provided with a key bit opening 10, having key-engaging surfaces 11 on opposed sides. At its rear end the bolt is provided with an inwardly-projecting guide lug 12. The forward end of the bolt is guided by the edges of the opening 7.

The bolt is held on its seat and in its engaged or disengaged position by means of the bail-shaped spring 13. The ends of the arms of this spring are arranged in seats 14 provided in the wall of the chamber 6, its front end engaging the opposite side of the chamber, as shown in Fig. 6. The arms of the spring 13 are bent inwardly and tension is applied thereto and to the spring retained in place by means of the plate 15. This plate is arranged in an annular seat 16 provided therefor and is secured, preferably by means of the lugs 17 formed integrally with the walls of the chamber. The plate 15 is provided with a slot 18 on its rear side for the guide lug 12 of the bolt. The plate is also provided with a laterally-projecting tongue 19 which engages a slot or notch 20 provided therefor in the wall of the chamber.

The bolt 8 in the structure illustrated, is provided with a pair of catch grooves 21, the spring 13 engaging one of the grooves when the bolt is in its shot or engaging position and the other when it is in its retracted position.

The latch 3 is provided with a keeper 22 for the bolt, as is clearly shown in the drawing. The key pin 23 is arranged in suitable bearing openings provided therefor in the front of the casing and the plate 15. This key pin is disposed centrally of the chamber 6 and through the bit opening 10 in the bolt 8. The pin 23 is shouldered at each end to provide bearings, see Fig. 4.

The keeper 24 is adapted to receive the laterally-projecting engaging portion 25 of the latch and has a cam or clamping action thereon. The casing and the keeper are provided with suitable holes for securing screws.

With the parts arranged as I have illustrated and described, they are economically produced and assembled. The machine work on the casing may all be done with a circular cutter, which is of great advantage in the economy of manufacture. The bolt is moved in both directions by the key and the key may be turned in either direction, which is of considerable advantage, as it is quite impossible to break the lock through the manipulation of the key.

The parts are, as stated, simple and economical to produce and are easily assembled. I have illustrated and described my improvements as embodied in a refrigerator latch lock. It may, however, be readily adapted or modified for use in other relations. I have not attempted to illustrate or describe such modifications as they will no doubt be readily understood by those skilled in the art to which this invention relates.

Having thus described my invention, what I claim as new and desire to secure by Letters Patent is:

1. The combination with a latch casing having an external groove-like latch seat and an internal cylindrical bolt chamber opening at one side into said latch seat; a latch having a bolt keeper on its inner side pivoted on said casing to swing into said seat; a bolt having a key bit opening therein provided with engaging surfaces at the front and rear sides thereof and an inwardly-projecting guide lug at its rear end, its forward end being guided by the edges of the opening between the latch seat and bolt chamber; a bail-shaped spring, the arms of said spring being bent inwardly and seated in the wall of said bolt chamber with its forward end engaging the wall on the opposite side of said chamber; a disk-like plate arranged in an annular seat provided therefor in the wall of said chamber to apply tension to said spring, the walls of said chamber being provided with integrally-formed clamping lugs for said plate, said plate being provided with a slot for the guide lug of said bolt and with a tongue engaging a notch provided therefor in the chamber wall; and a key pin disposed centrally of said bolt chamber and through the key opening of said bolt, said pin being shouldered at each end to engage openings provided therefor in the front of said casing and in said plate, all coacting for the purpose specified.

2. The combination with a latch casing having an external groove-like latch seat and an internal cylindrical bolt chamber opening at one side into said latch seat; a latch having a bolt keeper on its inner side pivoted on said casing to swing into said seat; a bolt having a key bit opening therein provided with engaging surfaces at the front and rear sides thereof and an inwardly-projecting guide lug at its rear end, its forward end being guided by the edges of the opening between the latch seat and the bolt chamber; a bail-shaped spring, the arms of said spring being bent inwardly and seated in the wall of said bolt chamber with its forward end engaging the wall on the opposite side of said chamber; a disk-like plate arranged in an annular seat provided therefor in the wall of said chamber to apply tension to said spring, said plate being provided with a slot for the guide lug of said bolt; and a key pin disposed centrally of said bolt chamber and through the key opening of said bolt, said pin being shouldered at each end to engage openings provided therefor in the front of said casing and in said plate, all coacting for the purpose specified.

3. The combination with a casing having an external groove-like latch seat and an internal cylindrical bolt chamber opening at one side into said latch seat; a latch having a bolt keeper on its inner side pivoted on said casing to swing into said seat; a bolt having a key bit opening therein provided with key-engaging surfaces at the front and rear sides thereof, and an inwardly-projecting guide lug at its rear end, said chamber being provided with an annular shoulder-like seat for said bolt; a bail-shaped spring arranged with its arms seated in the wall of said bolt chamber and its forward end engaging said bolt; and a plate arranged to apply tension to said spring provided with a slot for the guide lug of said bolt, and a key-bearing pin disposed centrally of said bolt chamber and through the opening of said bolt, said pin being arranged in bearing openings provided therefor in the front of the casing and in said plate.

4. The combination with a casing having an external groove-like latch seat and an internal cylindrical bolt chamber opening at one side into said latch seat; a latch having a bolt keeper on its inner side pivoted on said casing to swing into said seat; a bolt having a key bit opening therein provided with key-engaging surfaces at the front and rear sides thereof; a bail-shaped spring arranged with its arms seated in the wall of said bolt chamber and its forward end engaging said bolt; and a plate arranged to apply tension to said spring, and a key-bearing pin disposed centrally of said bolt chamber and through the opening of said bolt, said pin being arranged in bearing openings provided therefor in the front of the casing and in said plate.

5. The combination with a casing having an external groove-like latch seat and an internal bolt chamber opening at one side into said latch seat; a latch having a bolt keeper on its inner side pivoted on said casing to swing into said seat; a bolt having an inwardly-projecting guide lug at its rear end, its forward end being guided by the edges of the opening between the latch seat and bolt chamber; a bail-shaped spring bolt, the arms of said spring being arranged to engage the wall of the bolt chamber; a plate arranged in said seat provided therefor in the wall of said chamber to apply tension to said spring, the walls of said chamber being provided with integrally-formed clamping lugs for said plate, said plate being provided with a slot for the said guide lug of said bolt; and a key pin shouldered at each end to engage bearing openings provided therefor in the front of said casing and in said plate, all coacting for the purpose specified.

6. The combination with a casing having an external groove-like latch seat and an internal bolt chamber open at one side into said latch seat; a latch having a bolt keeper on its inner side pivoted on said casing to swing into said seat; a bolt, a bail-shaped spring, the arms of said spring being arranged to engage the wall of the chamber; a plate arranged in a seat provided therefor in the wall of said chamber to apply tension to said spring; and a key pin shouldered at each end to engage bearing openings provided therefor in the front of said casing and in said plate, all coacting for the purpose specified.

7. The combination with a casing having an external groove-like latch seat and an internal bolt chamber opening at one side into said latch seat; a latch having a bolt keeper on its inner side pivoted on said casing to swing into said seat; a bolt having an inwardly-projecting guide lug at its rear end; a bail-shaped spring arranged with its arms seated in the wall of said bolt chamber and its forward end engaging said bolt; and a plate arranged to apply tension to said spring provided with a slot for the guide lug of said bolt.

8. The combination with a casing having an external groove-like latch seat and an internal bolt chamber opening at one side into said latch seat; a latch having a bolt keeper on its inner side pivoted on said casing to swing into said seat; a bolt; a bail-shaped spring arranged with its arms seated in the wall of said bolt chamber and its forward end engaging said bolt; and a plate arranged to apply tension to said spring.

9. The combination with a casing having a bolt chamber therein; a bolt having a key bit opening therein provided with key-engaging surfaces at the front and rear sides thereof, and an inwardly-projecting guide lug at its rear end, said chamber being provided with an annular shoulder-like seat for said bolt; a bail-shaped spring catch arranged with its arms engaging the wall of said bolt chamber and its forward end engaging said bolt, said bolt being provided with a pair of catch grooves; and a plate arranged to apply tension to said spring provided with a slot for the guide lug of said bolt, and a key-bearing pin disposed centrally of said bolt chamber and through the opening of said bolt, said pin being arranged in bearing openings provided therefor in the front of the casing and in said plate.

10. The combination with a casing having a bolt chamber therein; a bolt having a key bit opening therein provided with key-engaging surfaces at the front and rear sides thereof; a bail-shaped spring catch arranged with its arms engaging the wall of said bolt chamber and its forward end engaging said bolt, said bolt being provided with a pair of catch grooves; and a plate arranged to apply tension to said spring, and a key-bearing pin disposed centrally of said bolt chamber and through the opening of said bolt, said pin being arranged in bearing openings provided therefor in the front of the casing and in said plate.

11. The combination with a casing having a bolt chamber therefor; a bolt having a key bit opening therein provided with key-engaging surfaces at the front and rear sides thereof, and an inwardly-projecting guide lug at its rear end, said chamber being provided with an annular shoulder-like seat for said bolt; a bail-shaped spring arranged with its arms engaging the wall of said bolt chamber and its forward end engaging said bolt, and a bolt arranged to apply tension to said spring, and a key-bearing pin disposed centrally of said bolt chamber and through the opening of said bolt, said pin being arranged in bearing openings provided therefor in the front of the casing and in said plate.

12. The combination with a casing having a bolt chamber therein; a bolt having a key bit opening therein provided with key-engaging surfaces at the front and rear sides thereof; a bail-shaped spring catch arranged with its arms engaging the wall of said bolt chamber and its forward end engaging said bolt, said bolt being provided with a pair of catch grooves; and a plate arranged to apply tension to said spring, and a key-bearing pin disposed centrally of said bolt chamber and through the opening of said bolt, said pin being arranged in bearing openings provided therefor in the front of the casing and in said plate.

13. The combination with a casing having a bolt chamber therein; a bolt having a key bit opening therein provided with key-engaging surfaces at the front and rear sides thereof; a bail-shaped spring arranged with its arms engaging the wall of said bolt chamber and its forward end engaging said bolt; and a plate arranged to apply tension to said spring, and a key-bearing pin disposed centrally of said bolt chamber and through the opening of said bolt, said pin being arranged in bearing openings provided therefor in the front of the casing and in said plate.

14. The combination with the casing having a bolt chamber therein; a bolt having a laterally-projecting guide lug at its rear end; an inner plate for said bolt chamber having a guide slot therein for said guide lug of said bolt; and a bail-shaped spring disposed between said bolt and plate with its loop end engaging the side of the bolt, said plate being arranged to support said spring.

15. The combination with the casing having an external groove-like latch seat and an internal bolt chamber at one side of said seat; a latch having a bolt keeper on one side pivoted on said casing to swing into said seat; a bolt arranged in said bolt chamber; an inner plate for said bolt chamber; and a bail-shaped spring arranged between said bolt and plate with its loop end engaging the side of the bolt, said spring being supported by said plate.

16. The combination with a casing, a bolt, a bail-shaped spring arranged to engage the side of said bolt, a back plate for said casing arranged to retain said spring, and a key pin shouldered at each end to engage bearing openings provided therefor in the front of said casing and in said back plate.

17. The combination with a casing, a bolt, a spring arranged to engage the side of said bolt, a back plate for said casing arranged to retain said spring, and a key pin shouldered at each end to engage bearing openings provided therefor in the front of said casing and in said back plate.

18. The combination with a casing, a bolt having an inwardly-projecting lug on its rear end, a spring for said bolt, a casing plate provided with a slot for said guide lug of said bolt, and a key pin shouldered at each end to engage bearing openings provided therefor in the front of said casing and in said back plate.

In witness whereof, I have hereunto set my hand in the presence of two witnesses.

DANIEL W. TOWER.

Witnesses:

GEORGE F. SINCLAIR,

H. M. BERTELSON.

Copies of this patent may be obtained for five cents each, by addressing the "Commissioner of Patents, Washington, D. C."